US010026454B2

(12) United States Patent
Davis et al.

(10) Patent No.: US 10,026,454 B2
(45) Date of Patent: Jul. 17, 2018

(54) STORAGE SYSTEM WITH CROSS FLOW COOLING OF POWER SUPPLY UNIT

(71) Applicant: Seagate Technology LLC, Cupertino, CA (US)

(72) Inventors: David Michael Davis, Portsmouth (GB); Odie Killen, Colorado Springs, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/698,618

(22) Filed: Apr. 28, 2015

(65) Prior Publication Data

US 2016/0324032 A1    Nov. 3, 2016

(51) Int. Cl.
*H05K 7/20* (2006.01)
*G11B 33/14* (2006.01)
*G11B 33/12* (2006.01)

(52) U.S. Cl.
CPC .......... *G11B 33/142* (2013.01); *G11B 33/128* (2013.01)

(58) Field of Classification Search
CPC .... G06F 3/0689; G06F 3/0625; G06F 1/3268; G06F 1/206; G06F 1/20; Y02B 60/1275; H05K 7/20145; G11B 33/142
See application file for complete search history.

(56) References Cited

U.S. PATENT DOCUMENTS

| | | | |
|---|---|---|---|
| 4,479,198 A * | 10/1984 | Romano | G06F 1/18 361/679.33 |
| 5,423,046 A | 6/1995 | Nunnelley et al. | |
| 5,546,558 A | 8/1996 | Jacobson et al. | |
| 5,600,538 A * | 2/1997 | Xanthopoulos | G06F 1/181 361/679.46 |
| 5,666,512 A | 9/1997 | Nelson et al. | |
| 5,900,007 A | 5/1999 | Nunnelley et al. | |
| 6,445,581 B1 * | 9/2002 | Carbonneau | G06F 1/20 165/80.4 |
| 6,525,935 B2 * | 2/2003 | Casebolt | G06F 1/181 312/236 |
| 6,618,248 B1 * | 9/2003 | Dalheimer | G06F 1/18 312/223.1 |
| 6,961,815 B2 | 11/2005 | Kistler et al. | |
| 7,035,972 B2 | 4/2006 | Guha et al. | |
| 7,082,030 B2 * | 7/2006 | Nakamura | H05K 7/20581 165/122 |
| 7,152,142 B1 | 12/2006 | Guha et al. | |
| 7,181,477 B2 | 2/2007 | Saika et al. | |
| 7,210,005 B2 | 4/2007 | Guha et al. | |
| 7,222,216 B2 | 5/2007 | Guha et al. | |
| 7,330,931 B2 | 2/2008 | Le et al. | |

(Continued)

*Primary Examiner* — James Wu
*Assistant Examiner* — Michael Matey
(74) *Attorney, Agent, or Firm* — Hall Estill Attorneys at Law

(57) ABSTRACT

Apparatus and method for cooling a power supply unit in a storage system. In some embodiments, a storage system includes a first section for receiving a plurality of storage media, a second section having a power supply unit, and a plenum arranged in communication with the first and second sections. The power supply unit has an inlet for receiving air, an outlet for exhausting air and an airflow generator which generates airflow therethrough, where the inlet and the outlet are in fluidic communication with the plenum.

18 Claims, 6 Drawing Sheets

(56) References Cited

U.S. PATENT DOCUMENTS

| | | | | |
|---|---|---|---|---|
| 7,369,406 B2* | 5/2008 | Matsushima | G11B 33/12 361/679.48 |
| 7,398,418 B2 | 7/2008 | Soran et al. | |
| 7,558,056 B2* | 7/2009 | Suzuki | G06F 1/20 361/679.46 |
| 7,646,602 B1* | 1/2010 | Tamarkin | H05K 7/20736 361/694 |
| 9,326,420 B2* | 4/2016 | Zhang | G06F 1/20 |
| 2004/0160720 A1* | 8/2004 | Yamanashi | G06F 1/20 361/103 |
| 2004/0218357 A1* | 11/2004 | Shih | H05K 7/20727 361/695 |
| 2005/0289361 A1 | 12/2005 | Sutardja | |
| 2006/0018094 A1* | 1/2006 | Robbins | H05K 7/20736 361/695 |
| 2007/0220912 A1* | 9/2007 | Miyamoto | H05K 7/20736 62/259.2 |
| 2008/0117590 A1* | 5/2008 | Dey | G06F 1/20 361/679.5 |
| 2008/0148303 A1* | 6/2008 | Okamoto | G11B 33/126 720/652 |
| 2008/0174948 A1* | 7/2008 | Davis | G11B 33/127 361/679.31 |
| 2008/0259563 A1* | 10/2008 | Fukuda | G06F 1/182 361/695 |
| 2011/0157811 A1* | 6/2011 | Tanaka | G06F 1/20 361/679.33 |
| 2011/0258405 A1 | 10/2011 | Asaki et al. | |
| 2011/0277967 A1* | 11/2011 | Fried | F28D 15/0266 165/104.26 |
| 2012/0054430 A1 | 3/2012 | Iwamitsu | |
| 2012/0327598 A1* | 12/2012 | Nakayama | G11B 33/142 361/692 |
| 2013/0258580 A1* | 10/2013 | Nakayama | G11B 33/128 361/679.33 |
| 2014/0233179 A1* | 8/2014 | Davis | H05K 7/20727 361/679.54 |

* cited by examiner

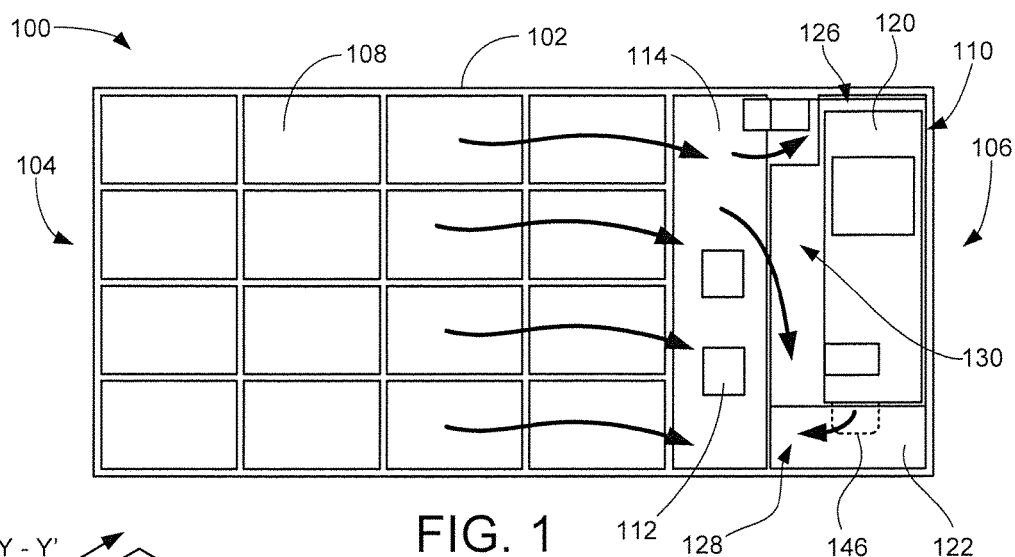
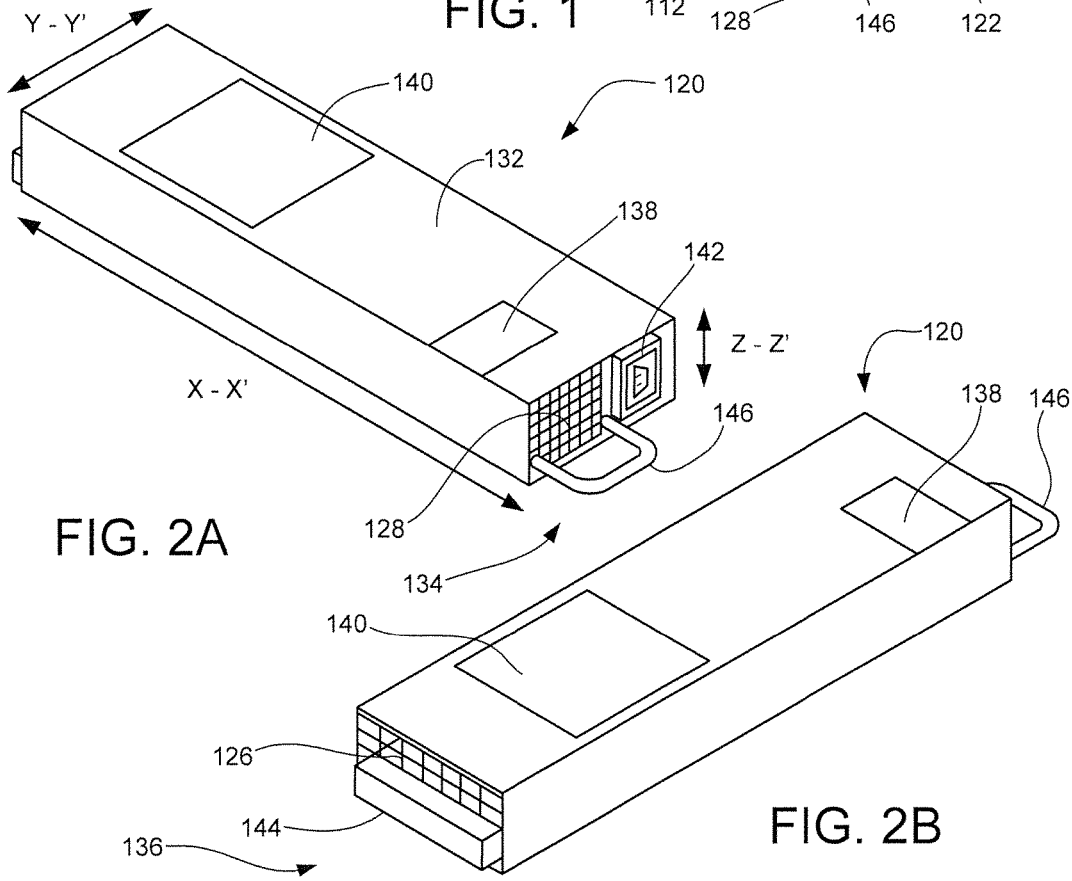

STORAGE SYSTEM WITH CROSS FLOW COOLING OF POWER SUPPLY UNIT

SUMMARY

Various embodiments of the present disclosure are generally directed to storage systems, and more particularly to a method and an apparatus for cooling a power supply unit of a storage system.

In some embodiments, a storage system includes a first section for receiving a plurality of storage media, a second section having a power supply unit, and a plenum extending between the first and second sections. The power supply unit has an inlet for receiving air from a first side, an outlet for exhausting air out a second side opposite the first side and an airflow generator which generates airflow therethrough, where the inlet and the outlet are in fluidic communication with the plenum.

In other embodiments, a method of cooling a power supply unit within a storage system comprises, in a storage system with a housing having a first section supporting a plurality of storage media and a second section supporting a power supply unit, steps of using a storage system fan to direct a primary airflow between the first and second sections; and generating a secondary airflow through the power supply unit by causing the secondary airflow to pass through an inlet of the power supply unit for receiving air and an outlet of the power supply unit for exhausting air, the inlet and the outlet in fluidic communication with the storage system fan.

In other embodiments, a power supply assembly has a power supply unit having an inlet at a first end, an outlet at an opposing second end and an interior fan to direct airflow from the inlet to the outlet through the power supply unit. A housing encloses the power supply unit and defines a channel exterior to the power supply unit in fluidic communication with the inlet and the outlet of the power supply unit.

These and other features which may characterize various embodiments can be understood in view of the following detailed discussion and the accompanying drawings.

BRIEF DESCRIPTION OF THE DRAWINGS

FIG. 1 provides a top plan schematic representation of a storage system that uses one or more power supply assemblies constructed and operated in accordance with various embodiments of the present disclosure.

FIGS. 2A and 2B are isometric depictions of a power supply unit (PSU) of the system of FIG. 1.

DETAILED DESCRIPTION

Figure 3:
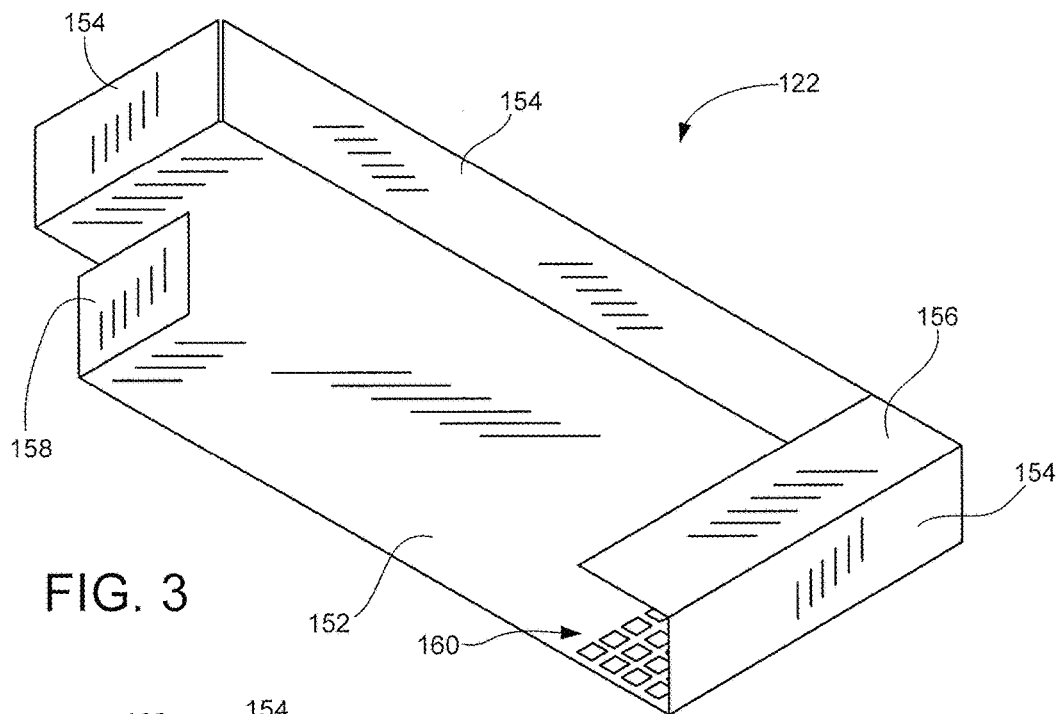
FIG. 3 is a housing of the power supply assembly in accordance with some embodiments.

Storage devices are used to store and retrieve user data. Such devices (media) may take a variety of forms such as but not limited to hard disc drives (HDDs) and sold-state drives (SSDs). Storage media may be incorporated into multi-device storage enclosures that incorporate multiple storage devices to form a consolidated memory space. Storage enclosures often incorporate components to support the operation of the storage media such as interconnection mechanisms (e.g., midplanes), power supplies, control electronics, cooling systems, etc.

As the desired data capacity of storage systems increases, it is desirable that a higher proportion of the volume of the storage system be occupied by storage media and a smaller proportion of the volume be used to house other components. Because storage media can generate a large amount of waste heat during operation, increasing the number of storage media tends to require improvements in the manner in which cooling is applied to the storage media and other components within the storage system.

FIG. 1 is a top schematic view of a storage system 100 constructed and operated in accordance with some embodiments. The storage system 100, also referred to as a storage enclosure, includes a rectilinear housing 102. The housing may take any suitable form. In some embodiments, the housing is sized to be installed in a 42 U server cabinet. In such case, the housing may have a width of nominally 19 inches, a height of 6 U (nominally 10.5 inches) and a length (depth) of about 35 inches.

The housing 102 defines a first section 104 and a second section 106. The first section 104 may be disposed toward a front portion of the housing 102 for placement adjacent a cold aisle zone, and the second section 106 may be disposed toward a rear portion of the housing adjacent a warm aisle zone.

The first section 104 is arranged to receive an array of storage media 108. The storage media 108 are contemplated as comprising HDDs, but such is merely exemplary and is not limiting as the storage media 108 can take a variety of forms including SSDs, hybrid HDDs, etc. In one embodiment, the storage media 108 are arranged as a 4×4×8 array to provide a total of 128 devices. Although primarily arranged for storage, the storage system 100 can incorporate one or more of processing, control, auxiliary power, back-up or hold-up batteries and/or switching elements in the first section 104. The system design allows trays in the front face of the housing 102 to be of different varieties to allow a configured system to be created as required.

The second section 106 is arranged to receive one or more power supply assemblies 110 which supply electrical power at suitable voltage levels for the storage media 108 and other components of the storage system 100, including control electronics 112 disposed on a printed circuit board assembly 114.

As explained in greater detail below, the power supply assemblies 110 include a power supply (also referred to as a "power supply unit" or "PSU") 120 and a power supply housing 122. The PSU 120 is arranged in a transverse orientation with respect to the length dimension of the storage enclosure housing 102. The power supply housing 122 has both an inlet 126 and an outlet 128 in fluidic communication with a plenum 130 disposed between the first and second sections 104, 106. The plenum 130 provides a fluidic passageway to direct cooling air and remove heat generated during operation of the storage enclosure 100 using storage enclosure fans (not separately shown) disposed within the housing 102 below the power supply assembly 110 in FIG. 1. Heavy arrows in FIG. 1 show the general arrangement of the directed airflow through the system, and this will be discussed in greater detail below.

FIGS. 2A and 2B show front and rear facing isometric representations of a PSU 120 for use in data storage systems such as the type described above in FIG. 1. The PSU serves to receive main power or other power from an external source and provide control power of a desired type and levels to the storage system. The PSU has a chassis 132 of generally cuboid (rectilinear) form with opposing front and rear ends 134, 136. The chassis 132 has a length X-X', width Y-Y' and depth (thickness) Z-Z'. The length X-X' is transverse (orthogonal) to the length dimension of the storage system enclosure (see FIG. 1). As will be explained below, the configuration and arrangement of the PSU within a storage system is, in contrast to known arrangements, provided such that the PSU is aligned with its longitudinal axis generally parallel with the width of the storage system. By providing such an arrangement, a number of benefits ensue.

The PSU includes the aforementioned inlet 126 (FIG. 2B) and outlet 128 (FIG. 2A), each including a protective screen mesh or similar cover. A flow of cooling air through the chassis 132 from the inlet 126 to the outlet 128 can be established using an internal fan, the top of which is denoted at 138. Removable cover plate 140 allows access to internal components of interest. Inlet electrical receptacle 142 receives input AC power (e.g., 120 VAC 60 Hz, etc.) from an external source, and output connector 144 outputs one or more system voltages (e.g., +5 VDC, +12 VDC, etc.). The PSU can be any size and provide any suitable capacity; in one embodiment, each PSU 120 is rated to output nominally 1.2 kW/1.4 kW of power at +5 VDC.

As required, a user handle 146 can be provisioned on the front end 134 of the chassis 132 to facilitate manipulation of the PSU 120. Rollers or other guide members (not separately shown) can be incorporated into the PSU to facilitate rolling movement of the chassis 132 in the X-X' direction. It will be appreciated, as noted above, that power supply units such as 120 are often arranged for installation into a housing along rollers or other tracks so that the X-X' direction is aligned in a longitudinal direction of the housing, such as by inserting the power supply from a rear facing surface of the housing. By contrast, the PSUs 120 are instead mounted in a transverse direction within the storage enclosure housing 102 (see FIG. 1), and so such guiding and rolling features may not be necessarily employed. Thus, the exemplary PSU 120 of FIGS. 2A-2B is merely illustrative of many different types of PSUs that can be utilized in accordance with various embodiments.

FIG. 3 shows the aforementioned power supply housing 122 from FIG. 1 in accordance with some embodiments. The housing 122 is generally formed as a three-dimensional construction which serves to provide a reference frame and positioning control of the PSU 120. Other forms and configurations can be used.

Figure 4:
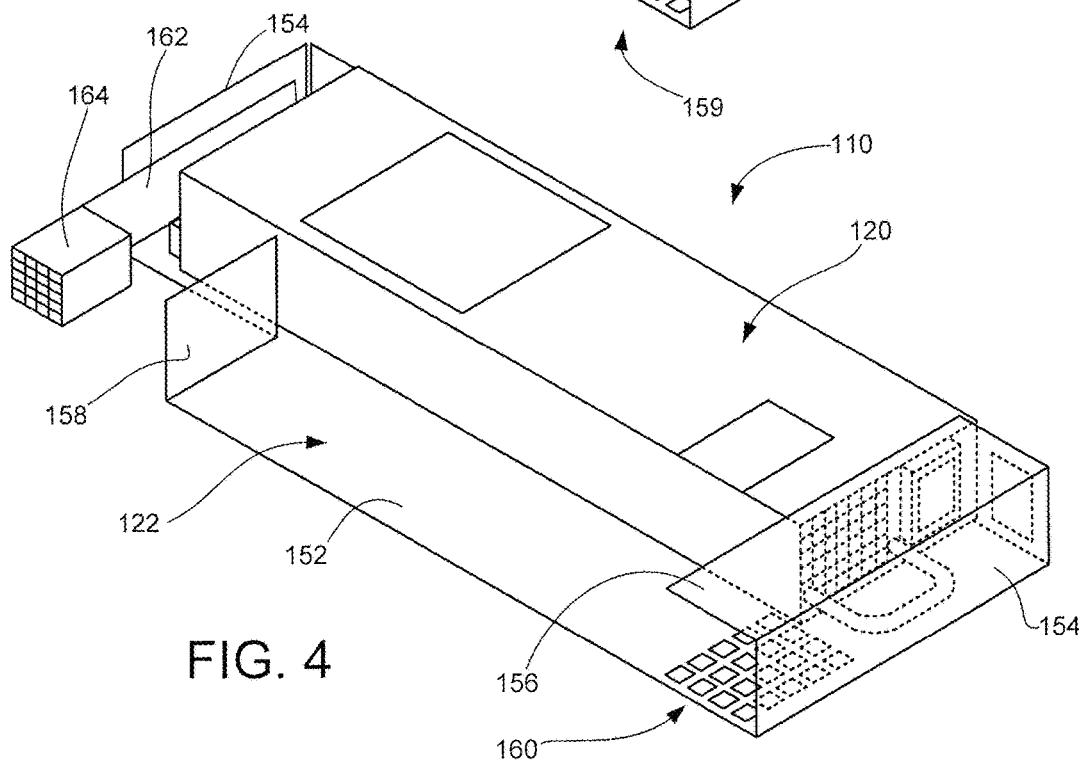
FIG. 4 is an isometric depiction of the power supply assembly formed from the PSU of FIGS. 2A-2B and the housing of FIG. 3.

The exemplary construction in FIG. 3 includes a substantially horizontal planar base portion 152, substantially vertically extending side walls 154, folded top cover 156 and intermediate baffle wall 158. Other configurations can be used including configurations that extend across a portion or the entirety of the top surface of the PSU chassis 132. The front portion of the base portion 152, forward facing sidewall 154 and top cover 156 form a u-shaped channel 159 proximate the front end 134 of the PSU 120, as represented in FIG. 4. An exit port 160 is formed by an array of rectilinear apertures that extend through the base portion 152 within the u-shaped channel.

The housing 122 is formed of a single unitary piece of material such as metal, stamped and otherwise processed in an appropriate way so as to provide a generally cuboid housing for the PSU 120. The housing 122 does not entirely enclose the PSU 120 in the example shown, but it does provide and define an outer cuboid envelope within which the PSU is disposed. The housing 122 is an independent structure arranged to receive removably within it the PSU 120 using suitable attachment mechanisms (not separately shown). In an alternative embodiment, the housing 122 may be formed as an integrated part and permanently coupled to the PSU 120. The housing 122 has attachment components to enable attachment of the assembly within the storage system 100.

As shown in FIG. 4, the power supply assembly 110 further includes an output printed circuit board assembly (PCBA) 162 that extends adjacent the rear end 136 of the PSU 120 and interconnects with the output connector 144 of the PSU (see FIG. 2B). The PCBA 162 terminates in a connector 164 which may interconnect with a bus bar or other power distribution mechanism to direct electrical power to the various operational components of the storage system 100 (see FIG. 1). When multiple power supply assemblies 110 are utilized and operated in tandem, both power supplies may be tied into the same power distribution mechanism to jointly supply the requisite power for the system.

Figure 5:
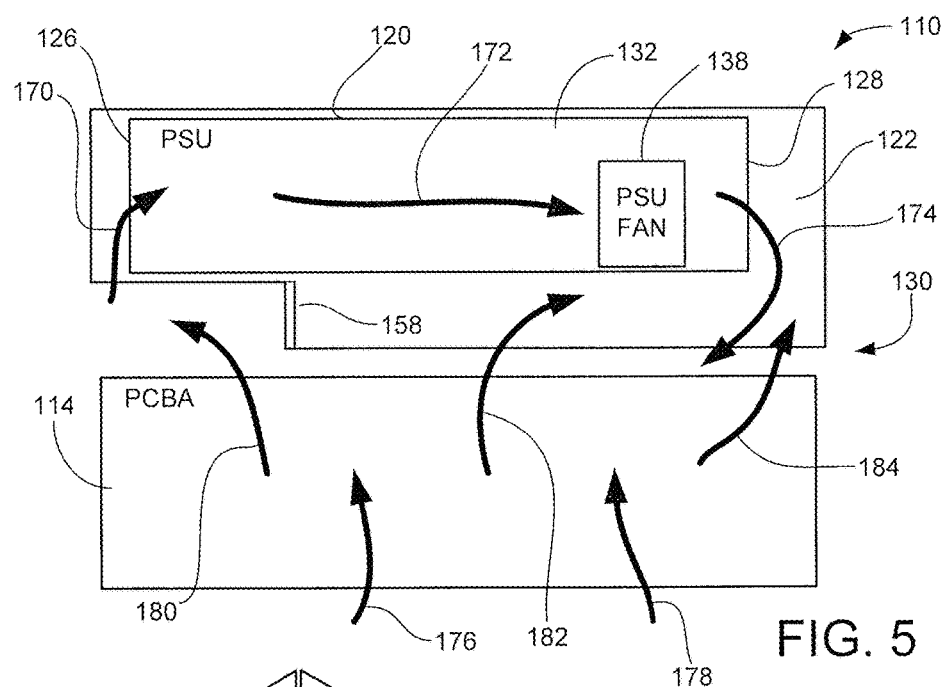
FIG. 5 is a top plan schematic depiction of airflow paths established using the power supply assembly of FIG. 4.

FIG. 5 is a top plan schematic representation of the power supply assembly 110 of FIG. 4 during operation. As noted above, the PSU 120 defines an airflow inlet 126 at the rear of the PSU chassis 132 and an airflow outlet 128 at the front of the chassis. The chassis is open so as to not block off either of the ends of the PSU. It follows that an airflow generator such as the PSU fan 138 provided within the PSU chassis, when operated, is able to draw air in via the airflow inlet 126 (e.g., represented by arrow 170), direct the air along the interior length of the chassis 132 (arrow 172) and exhaust the air out the airflow outlet 128 (arrow 174).

Enclosure or storage system fans (not separately shown in FIG. 5) are disposed below the power supply assembly 110 in fluidic communication with the plenum 130 between the power supply assembly 110 and PCBA 114 (see FIG. 1). The fans serve to generate a flow of air to cool and otherwise control the temperature of the storage media 108, by drawing airflow from the first section 104 of the storage enclosure housing 102 toward the second section 106 of the storage enclosure housing. This airflow is generally represented by arrows 176 and 178 and serves to apply cooling as required to components (including components with heatsinks) positioned on the PCBA 114.

The airflow next passes into the plenum 130 between the PSU 120 and the PCBA 114. Some of the air will be directed to one side of the baffle sidewall 158 and enter the inlet 126 of the PSU 120, as represented by arrow 180. A portion of the airflow represented by arrow 180 will pass into the inlet 126 of the PSU as arrow 170. Other portions of the air that enters the plenum 130 will be directed on the other side of the baffle sidewall 158 and pass toward the front end of the PSU 120, as represented by arrows 182, 184.

It will be noted that both the inlet and outlet 126, 128 of the PSU are in fluidic communication with the plenum 130. Because both the inlet and outlet 126, 128 are open to the plenum 130, a cross flow of air is established (e.g., 172 and 182; 174 and 184) as portions of the air pass "in parallel" along the plenum and through the PSU chassis. This cross flow airflow substantially eliminates any pressure delta that would otherwise impact the fan performance of the installed PSU by causing the fan to stall or otherwise operate at reduced efficiency.

Stated another way, because both inlet and outlet 126, 128 are open to the plenum 130, there is substantially no pressure differential between these two points. It follows that the airflow generator (PSU fan) 138 within the power supply unit 120 does not need to do any significant work against any form of pressure gradient between the ends of the PSU. Irrespective of whether the pressure within the plenum 130 due to operation of the storage system fans is positive or negative, substantially the same pressure will be present at both the inlet and the outlet of the power supply unit housing 132 and the fan 138 can operate to generate sufficient airflow through the PSU 120 to cool the unit. Once the airflow passes along the plenum, it can pass downwardly through the exit apertures 160 or other openings provided along the plenum to the storage system fans.

The transverse arrangement of the PSU 120 of the power supply unit within the storage system thus removes the potential of a pressure delta that might otherwise exist in a system in which only the inlet of the power supply cooling system is exposed to the internal part of a storage system, with such a pressure delta having the potential to stall the internal PSU fan. The arrangement of FIG. 5 thus effectively reduces heat from the PSUs using the main storage system airflow induced by the storage system fans.

Figure 6:
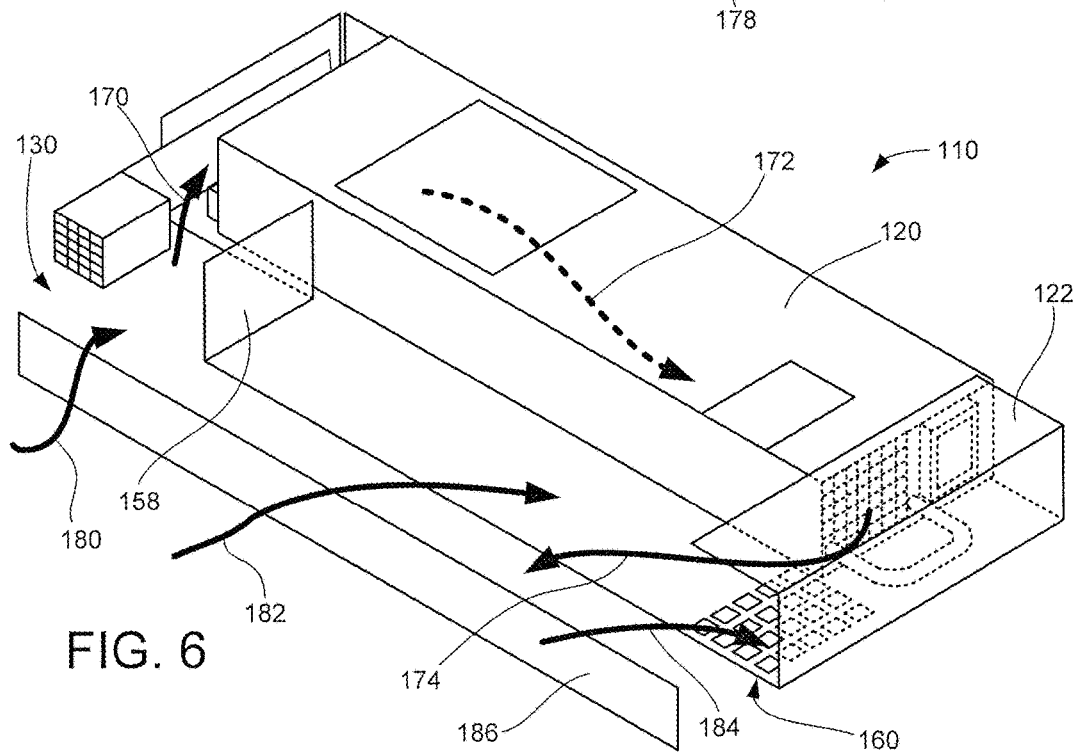
FIG. 6 shows the airflow paths of FIG. 5 using an isometric depiction of the power supply assembly.

FIG. 6 is an isometric illustration of the schematic diagram from FIG. 5. In some cases, a channel member 186, such as a power distribution bus bar, etc. can further direct the flow of air into the plenum 130 as described above.

Figure 7:
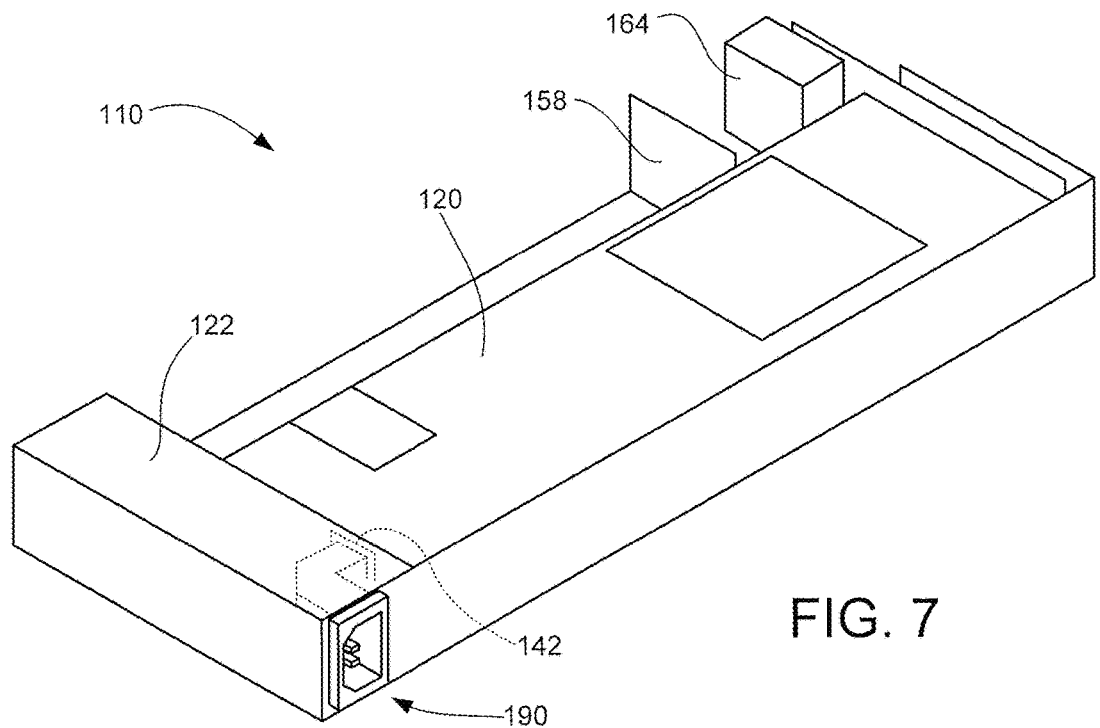
FIG. 7 is a rear isometric view of the power supply assembly.
Figure 8:
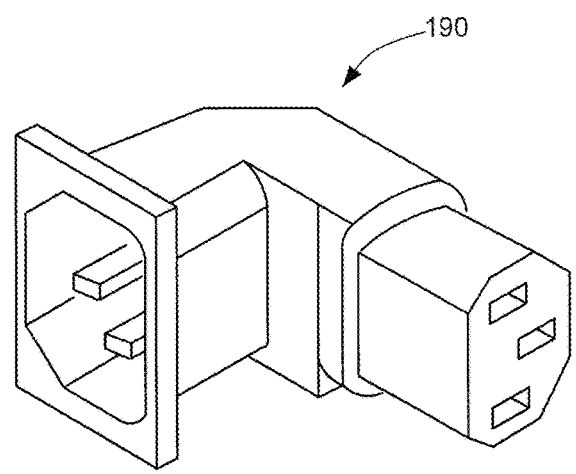
FIG. 8 is an isometric depiction of an electrical connector used in FIG. 7.

FIG. 7 is an isometric depiction of the power supply assembly 110 opposite that generally presented in FIG. 6. As shown in greater detail in FIG. 8, an electrical AC inlet adapter 190 can be used to couple the inlet electrical receptacle 142 (see FIG. 2A) of the PSU 120 to an external AC source via a suitable electrical cord (not separately shown). The adapter 190 is a single piece molded adapter that provides a 90 degree bend to accommodate the input power requirements for the power supply unit. Other arrangements can be used as desired.

Figure 9:
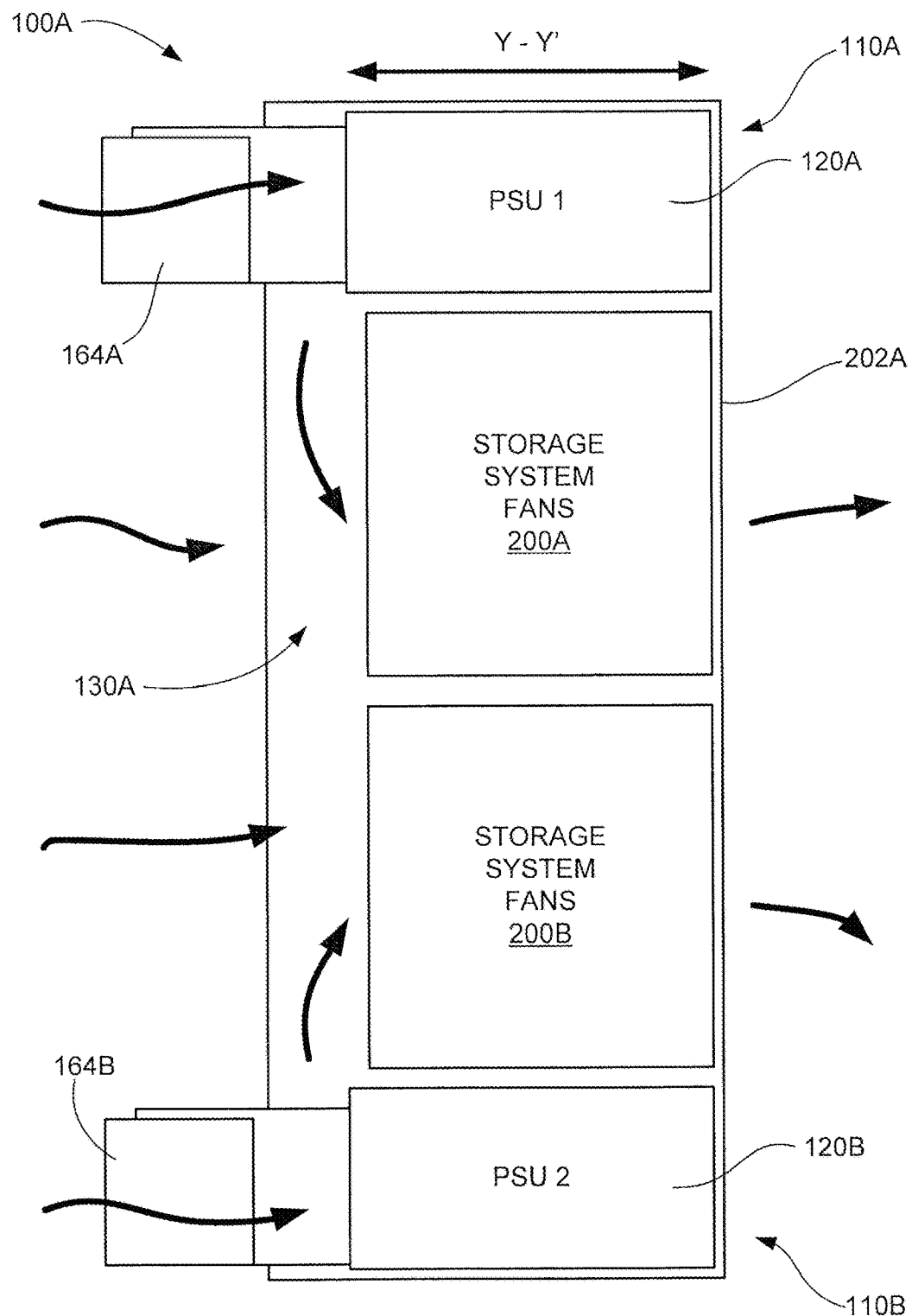
FIG. 9 is a generalized vertical cross-sectional depiction of another storage system similar to that of FIG. 1.

FIG. 9 is a schematic representation of a vertical cross section through the rear section 106 of a storage system 100A similar to the storage system 100 depicted in FIG. 1. As can be seen, first and second power supply assemblies 110A, 110B include first and second power supply units 120A, 120B (PSU 1 and 2) which are arranged transverse to the storage system such that the length of the short axis YY' of the power supply unit is substantially the only increase to the overall length of the storage system due to the presence of the power supply unit.

Storage system fan assemblies 200A, 200B are arranged between PSU 1 and PSU 2 120A, 120B to draw airflow into a plenum 130A as discussed above and out an exterior surface 202A of the storage system 100A through openings formed therein. Connectors 164A, 164B interconnect to supply electrical power from PSU 1 and PSU 2 to remaining components of the system 100A as discussed above.

Figure 10:
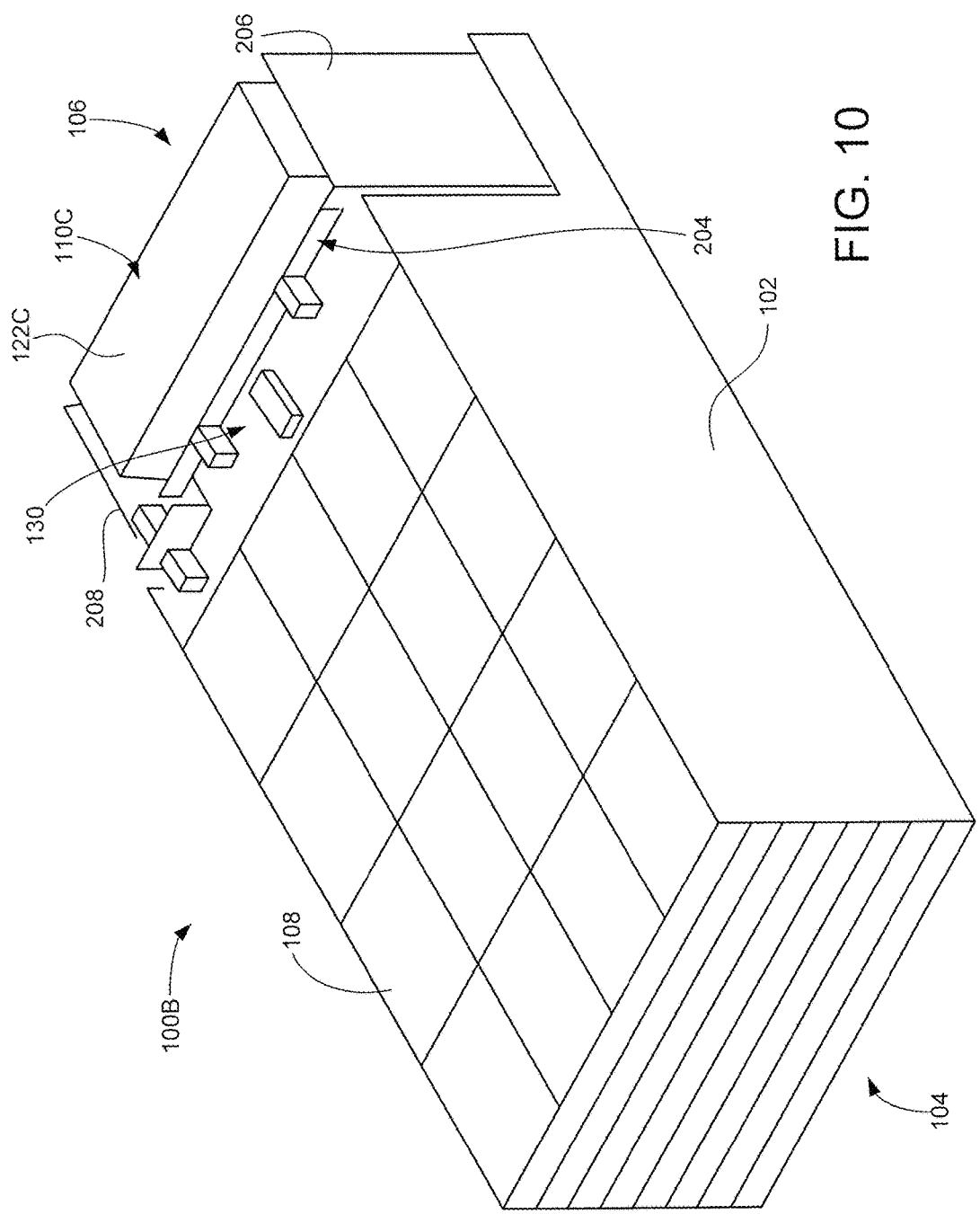
FIG. 10 is an isometric depiction of another storage system similar to that of FIG. 1.

FIG. 10 is another storage system 100B similar to the storage system 100 of FIG. 1, and like reference numerals are provided to denote similar components except as noted below. A plurality of power supply assemblies 110C are provisioned in a second portion 106 of the housing 102.

As before, each of the power supply assemblies includes a PSU and a housing; in this case, the housing, denoted at 122C, fully envelops the interior power supply unit (not separately shown) apart from an opening gap 204 in facing relation and fluidic communication to the plenum 130. Also as before, both inlet and outlet ports in the PSU are in fluidic communication to the plenum to allow cross flow airflow and pressure equalization as discussed above.

As desired, control PCBAs 206 and 208, also referred to as input/output units with one or more sets of control electronics, can be provisioned vertically within the storage system housing 102 as shown. As arranged, the input and output units define generally the vertical sides of the storage system with the power supply unit arranged therebetween.

It will be appreciated then that a conventional power supply unit can be used in the present system in an orientation which it was not originally intended for and that this may be achieved by mounting the PSU in a transverse orientation which establishes a cross flow airflow within the module. The cross flow airflow substantially eliminates the pressure delta that could otherwise impact the fan performance of the installed power supply unit. Furthermore, the transverse mounting of the PSU maximizes the density of storage within the storage system and reduces product length by allowing the power supply unit to occupy the same depth as the storage system fans in the enclosure.

In the examples described it has been stated that the power supply unit is arranged in such a manner within the storage system such that it lies substantially transverse to the longitudinal axis of the storage system. This provides the advantage that a reduced footprint is taken up by the power supply unit and so a greater proportion of the footprint of the storage system can be given over to storage media. The same or similar principle could also be used for other components that are usually provided in the rear section of a data storage system. Thus in a more general application of the principles described herein there is provided a storage system, having a housing for containing plural storage media and other ancillary components. These could be any one or more of power supply units (as previously described), input/output units/controllers and the like.

The storage system housing comprises a first section at the front for receiving plural storage media and/or other components such as one or more of processing, control and/or switching components; and a second section at the rear for containing the ancillary components. A plenum is arranged within the housing and the ancillary component comprises an input for receiving air and an output for exhausting air and a fan for generating airflow therethrough, wherein the input and the output are in fluid communication with the plenum. Thus the advantages described above with reference to power supply units can apply more generally to other aspects of the system. Of course the arrangement in a generally transverse configuration will provide the advantage of increased volume within the storage system whereas if the ancillary component comprises an internal fan for generating a cooling airflow then the advantages with respect to the removal of the pressure gradient between the air input and air output will be also be derived.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A storage system comprising:
a first section for receiving a plurality of storage media;
a second section having a power supply unit and one or more storage system fans, the power supply unit having a first depth, the one or more storage system fans having a second depth, the first and second depths being substantially the same; and
a plenum extending between the first and second sections, the plenum configured to establish a cross flow of air in the second section so that a first portion of airflow established by the one or more storage system fans passes longitudinally along the plenum and a second portion of airflow established by the one or more storage system fans passes in parallel with the first portion through the housing to the single inlet, the power supply unit comprising a chassis defining a single inlet for receiving air from a first side, a single outlet for exhausting air out a second side opposite the first side and an airflow generator which generates airflow therethrough, the single inlet and the single outlet in fluidic communication with the plenum, the power supply unit positioned within a housing having a baffle wall extending perpendicular to the chassis to separate airflow of the single inlet from airflow from the single outlet.

2. The storage system of claim 1, comprising a storage system airflow generator, for generating a flow of air within the storage system to control the temperature of storage media within the storage system, wherein the plenum is in direct fluid communication with the storage system airflow generator.

3. The storage system of claim 1, wherein the housing has respective length, width and depth dimensions, the length dimension defined by a direction extending from the first section to the second section and the width dimension defined in a direction orthogonal to the length dimension across the second section, wherein the power supply unit is generally elongate in a length direction from the single inlet to the single outlet, and wherein the power supply unit is mounted in a transverse orientation so that the length direction of the power supply unit is parallel to the width dimension of the housing.

4. The storage system of claim 1, in which the first section is a front section and the second section is a rear section and wherein the plenum is arranged intermediate the front section and the rear section.

5. The storage system of claim 1, in which the housing is formed from a unitary shaped piece of material.

6. The storage system of claim 5, in which the material is metal and the housing is formed from a unitary stamped piece of metal.

7. The storage system of claim 1, wherein the housing for the power supply unit has a U-shaped channel positioned proximal the single outlet and configured to re-direct outlet airflow perpendicularly away from the single outlet, parallel with the baffle wall.

8. The storage system of claim 7, in which the U-shaped channel re-directs outlet airflow into apertures in a base portion of the plenum.

9. The storage system of claim 1, comprising input and output units provided on planar PCBs arranged vertically within the storage system housing, wherein the input and output units define generally the vertical sides of the storage system and wherein the power supply unit is arranged therebetween.

10. A method of cooling a power supply unit within a storage system, the storage system comprising a housing having a first section supporting a plurality of storage media and a second section supporting a power supply unit, the method comprising:
using a storage system fan to direct a primary airflow between the first and second sections, the primary airflow in fluidic communication with a single inlet and a single outlet of the power supply unit so that a pressure of the primary airflow at the single inlet is nominally equal to a pressure of the primary airflow at the single outlet, the primary airflow passing parallel with the first section through the housing to the single inlet; and
generating a secondary airflow through the power supply unit by causing the secondary airflow to pass through the single inlet of the power supply unit for receiving air and through the single outlet of the power supply unit for exhausting air, the single inlet and the single outlet defined by a power supply chassis, the power supply unit positioned within a housing having a baffle wall extending perpendicular to the power supply chassis to separate airflow of the single inlet from airflow from the single outlet, the secondary airflow passing longitudinally along the power supply unit, the primary and secondary airflows establishing a cross flow of air in the second section.

11. The method of claim 10, in which the secondary airflow is generated using an airflow generator within the power supply unit.

12. The method of claim 10, wherein the primary airflow is in fluidic communication with the single inlet and the single outlet of the power supply unit so that a portion of the primary airflow is passed through the power supply unit single inlet to establish the secondary airflow.

13. The method of claim 10, further comprising disposing the power supply unit in a power supply unit housing which defines a channel exterior to the power supply unit along which a portion of the primary airflow passes, the channel in fluidic communication with the storage system fan and configured to block the secondary flow in a first direction parallel to a longitudinal axis of the power supply unit and re-direct the secondary flow away from the single outlet along a second direction perpendicular to the longitudinal axis of the power supply unit.

14. The method of claim 13, further comprising passing a portion of the primary airflow and a portion of the secondary airflow through an exit aperture in the power supply unit housing to the storage system fan, the exit aperture separate from the power supply chassis and adjacent to the single outlet of the power supply unit.

15. A power supply assembly, comprising:
a power supply unit having a single inlet at a first end, a single outlet at an opposing second end and an interior fan to direct airflow from the inlet to the outlet through the power supply unit, the single inlet and single outlet defined by a power supply chassis; and
a housing which encloses the power supply unit, has a channel exterior to the power supply unit proximal the single outlet, and is in fluidic communication with the single outlet of the power supply unit to re-direct outlet airflow away from the single outlet in a first direction perpendicular to a longitudinal axis of the power supply unit, the housing formed of sheet metal to form a rectilinear structure in which the power supply unit nests and having a baffle wall extending perpendicular to the longitudinal axis of the power supply chassis to separate airflow of the single inlet from airflow from the single outlet, the housing configured to establish a cross flow of air proximal the single outlet with a first portion of airflow passing in a second direction parallel to the longitudinal axis of the power supply chassis and a second portion of airflow passing in the first direction to the single inlet.

16. The power supply assembly of claim 15, wherein the baffle wall is positioned between the single inlet and the single outlet of the power supply unit.

17. The power supply assembly of claim 15 in combination with a storage enclosure housing, wherein a plurality of storage devices are disposed within a front portion of the storage enclosure housing and the power supply assembly is mounted in a transverse direction in a rear portion of the storage enclosure housing so that the single inlet and single outlet of the power supply unit are nominally equidistant from the storage devices.

18. The power supply assembly of claim 17, wherein the storage enclosure housing further comprises a storage enclosure fan disposed below the power supply assembly which establishes a primary airflow that passes from the storage devices to the housing of the power supply assembly, wherein a first portion of the primary airflow passes through an exit aperture of the housing of the power supply assembly and a second portion of the primary airflow establishes a secondary airflow through the power supply unit from the single inlet to the single outlet in parallel with the first portion, the exit aperture separated from the power supply chassis and extending along a plane of the housing perpendicular to the single outlet.

* * * * *